US011616691B1

(12) United States Patent
Atri et al.

(10) Patent No.: US 11,616,691 B1
(45) Date of Patent: Mar. 28, 2023

(54) RECONFIGURATION OF SERVER CLUSTERS

(71) Applicant: Rakuten Mobile, Inc., Tokyo (JP)

(72) Inventors: Rahul Atri, Singapore (SG); Mohit Luthra, Singapore (SG); Bharath Rathinam, Tokyo (JP); Puneet Devadiga, Tokyo (JP); Ashish Madan, Singapore (SG); Amber Jain, Madhya Pradesh (IN); Apoorva Soni, Madhya Pradesh (IN); Shubham Rathore, Madhya Pradesh (IN); Rajat Sethi, Madhya Pradesh (IN); Pramod Parmar, Madhya Pradesh (IN); Seihin Shu, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/487,696

(22) Filed: Sep. 28, 2021

(51) Int. Cl.
*H04L 41/0813* (2022.01)
*H04L 41/084* (2022.01)

(52) U.S. Cl.
CPC ...... *H04L 41/0813* (2013.01); *H04L 41/0843* (2013.01)

(58) Field of Classification Search
CPC .................. H04L 41/0813; H04L 41/0843
See application file for complete search history.

(56) References Cited

U.S. PATENT DOCUMENTS

| 9,426,030 | B1 | 8/2016 | Anerousis et al. | |
| 2016/0380815 | A1* | 12/2016 | Agarwal | H04L 49/25 709/220 |
| 2017/0208138 | A1* | 7/2017 | Baxter | H04L 41/5051 |
| 2018/0113748 | A1* | 4/2018 | Pagade | H04L 67/1095 |
| 2020/0128426 | A1* | 4/2020 | Fox | H04L 47/2441 |
| 2021/0144517 | A1* | 5/2021 | Guim Bernat | H04W 12/04 |
| 2022/0019364 | A1* | 1/2022 | Nair | G06F 3/0607 |

OTHER PUBLICATIONS

Liu et al., "Dependent Task Placement and Scheduling with Function Configuration in Edge Computing", IEEE/ACM 27th International Symposium on Quality of Service, Jun. 24, 2019.*
Kang et al., "Geographic CLustering Based Mobile Edge Computing Resource Allocation Optimization Mechanism", 2019 15th International Conference on Network and Servivce Management, Oct. 21, 2019.*

* cited by examiner

*Primary Examiner* — Todd L Barker
(74) *Attorney, Agent, or Firm* — Hauptman Ham, LLP

(57) ABSTRACT

A method includes identifying a master template from a repository corresponding to one or more servers in a preconfigured cluster positioned at an edge location. The identifying also includes receiving an input from a user defining a new configuration set by the user. The identifying also includes changing one or more parameter values in at least one configuration profile references. The identifying also includes creating a new master template based on the one or more parameter values. The identifying also includes creating a new planned inventory file based on the new master template. The identifying also includes changing an existing configuration of the one or more servers in the preconfigured cluster during runtime, based on the new planned inventory file.

20 Claims, 13 Drawing Sheets

FIG. 2C

RECONFIGURATION OF SERVER CLUSTERS

BACKGROUND

A server cluster is a set of servers that work together to be viewed as a single system. Unlike grid servers, server clusters have each node set to perform the same task, controlled and scheduled by software. The components of a cluster are usually connected to each other through networks, with each node running an operating system. Clusters are usually deployed to improve performance and availability over that of a single computer, while typically being much more cost-effective than single computers of comparable speed or availability.

Edge computing is a distributed computing paradigm that brings computation and data storage closer to the location where edge computing is needed to improve response times and save bandwidth. Edge computing is a topology rather than a technology. The origins of edge computing lie in content delivery networks that served web and video content from edge servers that were deployed close to users of the web and video content. Edge networks evolved to host applications and application components at the edge servers, resulting in commercial edge computing services that hosted applications such as dealer locators, shopping carts, real-time data aggregators, and ad-insertion engines.

BRIEF DESCRIPTION OF THE DRAWINGS

Aspects of the present disclosure are best understood from the following detailed description when read with the accompanying FIGS. In accordance with the standard practice in the industry, various features are not drawn to scale. In fact, the dimensions of the various features be arbitrarily increased or reduced for clarity of discussion.

FIG. 2C is a pictorial representation of a application profile input form, in accordance with embodiments of the present invention.

DETAILED DESCRIPTION

Figure 1A:
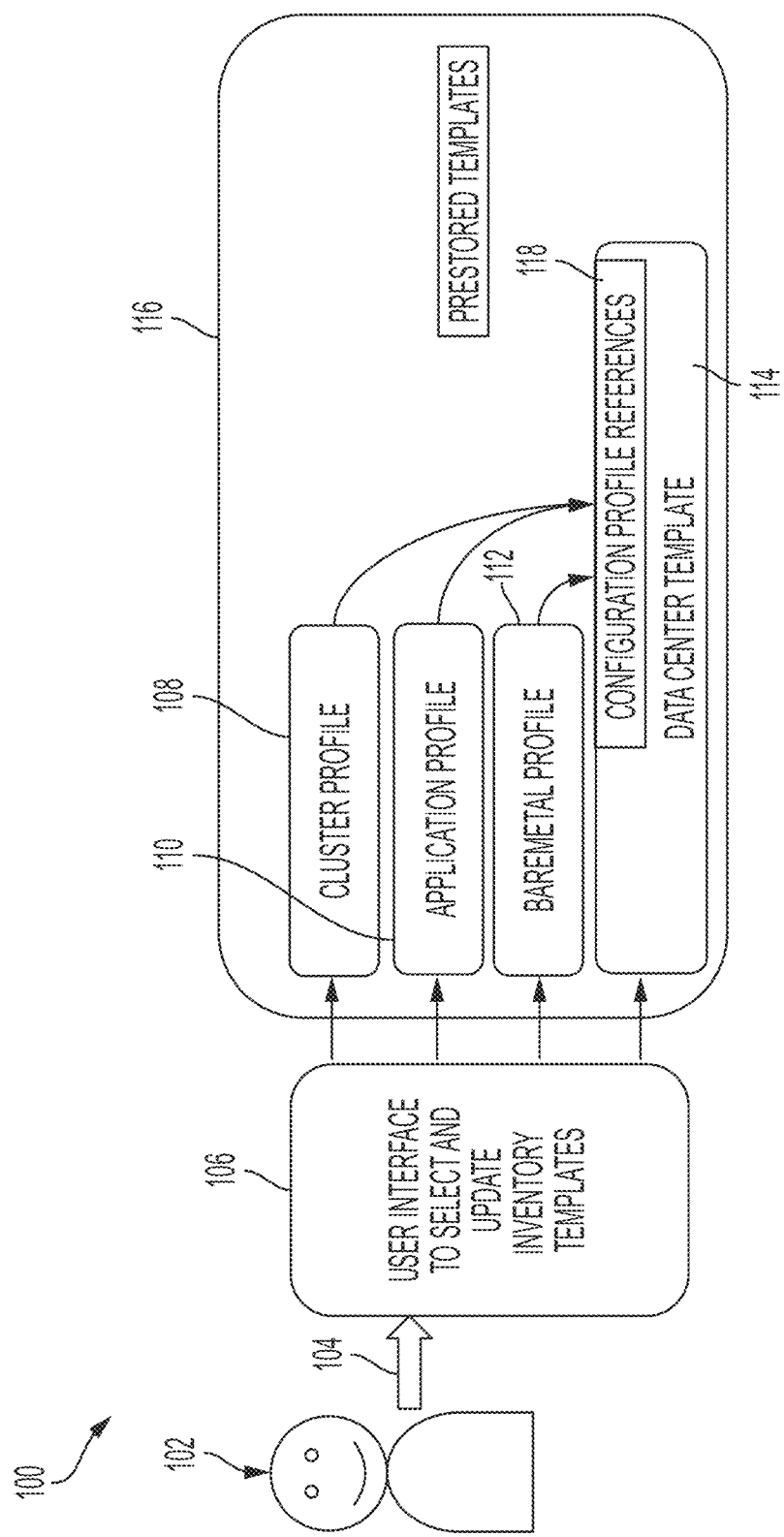
FIG. 1A is a diagram representation of a server-cluster reconfiguration system, in accordance with some embodiments.

The following disclosure includes many different embodiments, or examples, for implementing different features of the subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows include embodiments in which the first and second features are formed in direct contact, and also include embodiments in which additional features be formed between the first and second features, such that the first and second features not be in direct contact. In addition, the present disclosure repeats reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, be usable herein for ease of description to describe one element or feature's relationship to another element(s) or feature(s) as illustrated in the FIGS. The spatially relative terms are intended to encompass different orientations of the device in use or operation in addition to the orientation depicted in the FIGS. The apparatus be otherwise oriented (rotated 90 degrees or at other orientations) and the spatially relative descriptors usable herein likewise be interpreted accordingly.

In some embodiments, one or more clusters of servers positioned at an edge location that are pre-configured (e.g., containing already established configuration profile references) are reconfigured (e.g., to operate with one or more newly established configuration profile references) during runtime (e.g., while the configuration file is executing). Throughout examples of this disclosure, cluster, server-cluster, and servers are usable interchangeably, unless specifically stated otherwise. Reconfiguration or modification of an existing configuration is performed by obtaining an existing template from a template repository storing many pre-stored templates. A template is chosen from the repository that corresponds to the existing configuration parameters. Thus, changes made to one or more parameters based on a user's selection create a more efficient server-cluster template and are easily inserted into a new server-cluster configuration that replaces the existing server-cluster configuration. Further, a new template, based on the user's changes, is saved in the existing template repository for future use as a selectable template by the same user or another user. The newly created template further creates a planned inventory file that switches the server-cluster from an old server-cluster configuration to a new server-cluster configuration during run time.

In some other approaches, to make a change from pre-configured cluster parameters the source code is manually changed. When a user wants to make a change; even to a single parameter, the source code is manually changed and a complete source code release life cycle is performed in order to bring about the change. In some other approaches, Excel based inventory maintenance tools are available, but are difficult to manage and prone to errors. In some other systems, writing a new inventory file manually takes several hours for any reconfiguration. A repetitive process which has to be followed every time a change in configuration occurs. Manually writing a new cluster planned inventory is prone to human errors in the coding of the planned inventory file. Other such systems have an inventory file created again from scratch for new clusters. Increasing the chances of conflicts such as internet protocol (IP) address conflict.

In some embodiments, a server cluster reconfiguring system creates new templates, is configured to supply stored templates, and automates the creation of source code using the templates. A user may input one or more parameters (e.g., desired changes) from configuration profile references included in the selected templates that, in turn, create further new templates for reconfiguration purposes. Reconfiguration deployment of the newly selected template is performed using stored templates and updating parameter values in the stored templates. The stored templates reduce the labor necessary to create inventory files from scratch and no manual file updating.

In some embodiments, dynamic cluster reconfiguration is an option. Once a cluster is created, the effect on other existing server-cluster configurations creates a potential to reconfigure or change other existing server-cluster configurations (e.g., a domino effect where one change affects other systems). Pre-stored templates for reconfiguration of the clusters are usable in this situation. During runtime, when there is a reconfiguration at a preconfigured cluster, a user is able to use existing profile reference templates and change parameters based on configuration profile references in one or more of the profile reference templates. The changed parameters crate a new template and the newly created template is stored for future use. Further, a new inventory file is created that is usable by cloud services, such as BareMetal as-a-service (BMaaS) toll, to reconfigure the cluster. Bare-metal services are cloud offerings that are comparable to renting a raw, dedicated server from a managed service provider (MSP). Like traditional dedicated servers, bare-metal instances are not preinstalled with a hypervisor and provide raw access to the system hardware.

In some embodiments, a runtime configuration change is made to an existing preconfigured cluster while the cluster is actively being usable with old values. A runtime configuration made by a user creates a new template with new parameters and further creates a new inventory file. The new inventory file switches the configuration of the cluster pursuant to the new parameters. Further, the switching of the old configuration with a new configuration is performed during runtime and no shutdown is necessary. In some embodiments, a user submits an input request containing new parameters for reconfiguration of an already running cluster. A system then identifies templates corresponding to the existing cluster. The user then modifies the input parameters from the configuration profile references in the identified template and creates a new master template. The system creates a new inventory file as well as a new master template. The system then reconfigures the existing cluster by switching to the configuration corresponding to the new inventory file.

In some embodiments, a new template is created through modification parameters of existing master templates. The server cluster reconfiguring system is configured to use pre-stored or existing master templates for re-configuration of the clusters. During run time, when there is a reconfiguration requirement at a preconfigured cluster, the server cluster reconfiguring system is configured to use existing profile reference templates and change parameters in one or more of the profile reference template. The server cluster reconfiguring system is configured to receive the changed parameters, create a new master template, and store the new master template for future use. For example, when the server cluster reconfiguring system is currently using a predefined master template designed to create a cluster and/or configure a cluster for the first time, the same predefined master template is stored in a repository and is configured to be a ready to use again as a template. Whenever, there is a need to reconfigure a cluster of one or more servers, the reconfiguration is performed by receiving user inputs for changed parameters, changing the server cluster parameters in the existing master template, and creating a new master template having new set of parameter values. The server cluster reconfiguring system is further configured to create a new inventory file, which is used by BMaaS to reconfigure the cluster.

In some other approaches, when a user wants to change a runtime configuration, the user makes a change in the automation source code. This change in the automation source code follows the complete release life cycle of software to production that includes validation of the new source code in tests and this process generally takes a few-weeks' time.

In some embodiments, the template-switching system of this disclosure abridges the runtime change in configuration. When a user wants to make a change in any parameter, the user simply fills another profile template and creates a new data center template. Further, the next time the user wants to create a cluster, the user simply selects the new data center template the user created earlier. There is no manual changing of source code or even a need to inform a source code development team.

In some embodiments, predefined and pre-created templates are based off of the existing templates created for the first use of the cluster. Once another template is created in the reconfiguration process, this template is stored for possible future use. Making selection of reconfiguration templates efficient. Whenever a cluster of multiple servers is reconfigured the reconfiguration is performed by selecting a similar template to the preconfigured template currently usable, taking user inputs, changing parameters from configuration profile references in selected template, creating a new template based on the user's changes, and storing the new template for future use. The new template is then usable to create a new inventory file and reconfigure the cluster during runtime using the newly created inventory file.

In some embodiments, real-time reconfiguration of parameters use parallel instances of processes. Thus, when parameters need to be updated in three reference profiles, then parallel instances will be initiated to update the values parallel and create a final template which provides reconfiguration in real-time (e.g., a faster response, instead of waiting for each reference profile to be updated one by one).

FIG. 1A is a diagram representation of a server-cluster reconfiguration system 100, in accordance with some embodiments.

Figure 9:
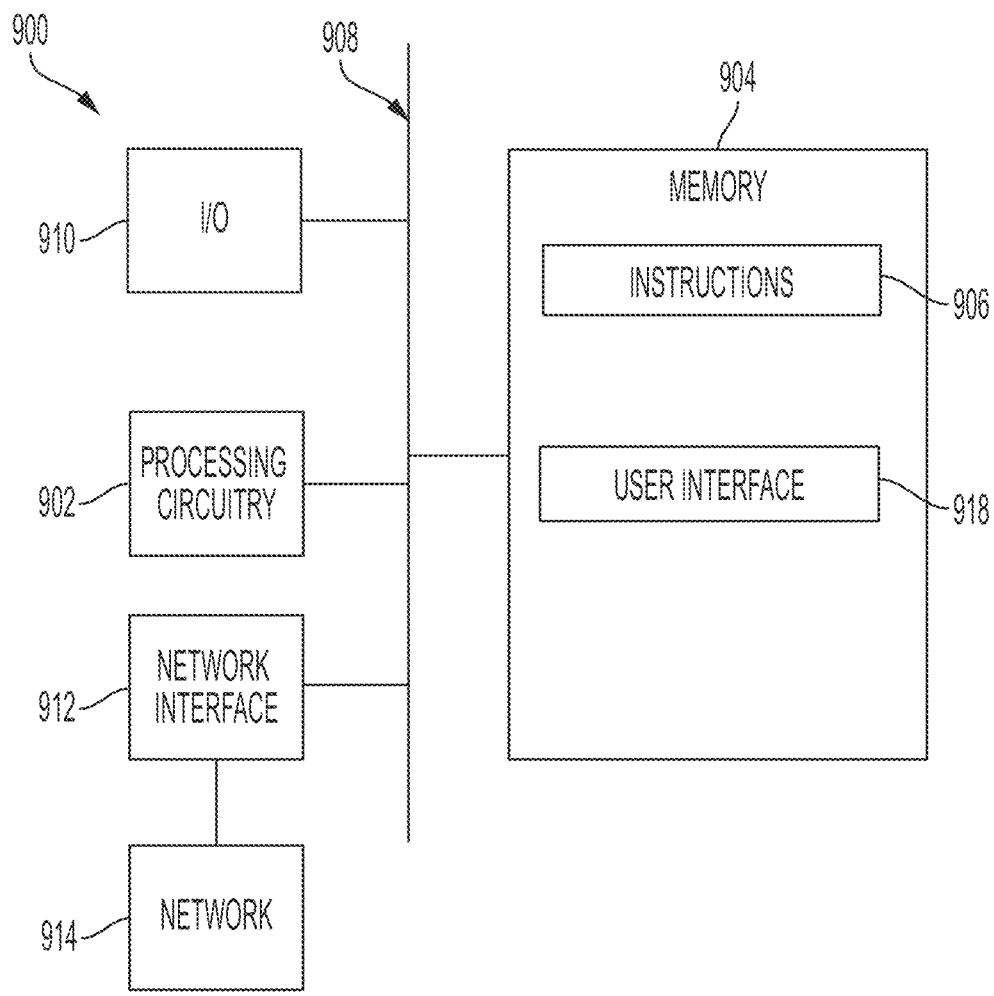
FIG. 9 is a high-level functional block diagram of a server-cluster reconfiguration processor-based system, in accordance with some embodiments.

Server-cluster reconfiguration system (SCRS) 100 includes user interface (U/I) 102. System 100 includes processing circuitry 902 (FIG. 9) and also includes a memory 904 (FIG. 9) connected to processing circuitry 902 (FIG. 9), where the memory is configured to store executable instructions 906 (FIG. 9). Executable instructions 906 when executed by processing circuitry 902, facilitate performance of operations, including receiving, from a user 102, a new input request 104, at user interface 106, including new parameters for an existing preconfigured cluster. User interface 106 allows user 102 to input parameters related to configuration profile references that are being changed within the existing preconfigured cluster. Based upon the user's selection of a template to replace the preconfigured cluster template (e.g., a template similar to the template being replaced) and inputted parameter changes (e.g., configuration profile references such as, cluster profile 108, application profile 110, and BareMetal profile 112) a new template is created at data center template engine 114. Data center template engine 114 receives the user's template selection and inputted parameter changes to the configuration profile references and creates a new template to be stored in pre-stored templates database 116. Further, user 102 is able to select a desired template from the pre-stored templates database from user interface 106. Data center template engine 114 then modifies the identified and selected template, based on the user's inputted changing parameters received at configuration profile references 118 forwarded through user interface 106 and profiles 108, 110 and 112. Data center template engine 114, then creates a new master template based upon the user's changes to be stored in pre-stored templates 104. Further, data center template engine 114 creates a new inventory file that is usable by cloud services, such as BMaaS toll, to reconfigure the existing cluster.

User 102 interacts with user interface 106 and inputs a new template request. When a new template has been selected, user 102 is able to input new parameters, such as a change of one or more configuration profile references for reconfiguration of an already operating cluster. User interface 106 is where interactions between user 102 and pre-stored template database 116 occur. User interface 106 allows effective operation and control of SCRS 100 by user 102. In some embodiments, user interfaces are composed of one or more layers, including a human-machine interface (HMI) that interfaces machines with physical input hardware such as keyboards, mice, or game pads, and output hardware such as computer monitors, speakers, printers and other suitable user interfaces are within the contemplated scope of the disclosure. Additional user interface layers may interact with one or more human senses, including: tactile user interface (touch), visual user interface (sight), auditory user interface (sound), olfactory user interface (smell), equilibrial user interface (balance), gustatory user interface (taste) and other suitable user interface layers are within the contemplated scope of the disclosure.

User interface 106 interacts with pre-stored template database 116. User interface 106 presents user 102 with several graphical user interfaces (e.g., display pages shown in FIGS. 2A-2D) where user 102 is able to select a replacement configuration template, input or change parameters for each configuration profile reference including: cluster profile 108, application profile 110, and Baremetal profile 112. Further, user 102 identifies templates corresponding to the cluster that user 102 desires to reconfigure at user interface 106. Based on the user's selected template and inputted parameters data center template engine 114 creates a new template for storage in pre-stored template database 116 and an inventory file is automatically created for the reconfiguration process.

Figure 1B:
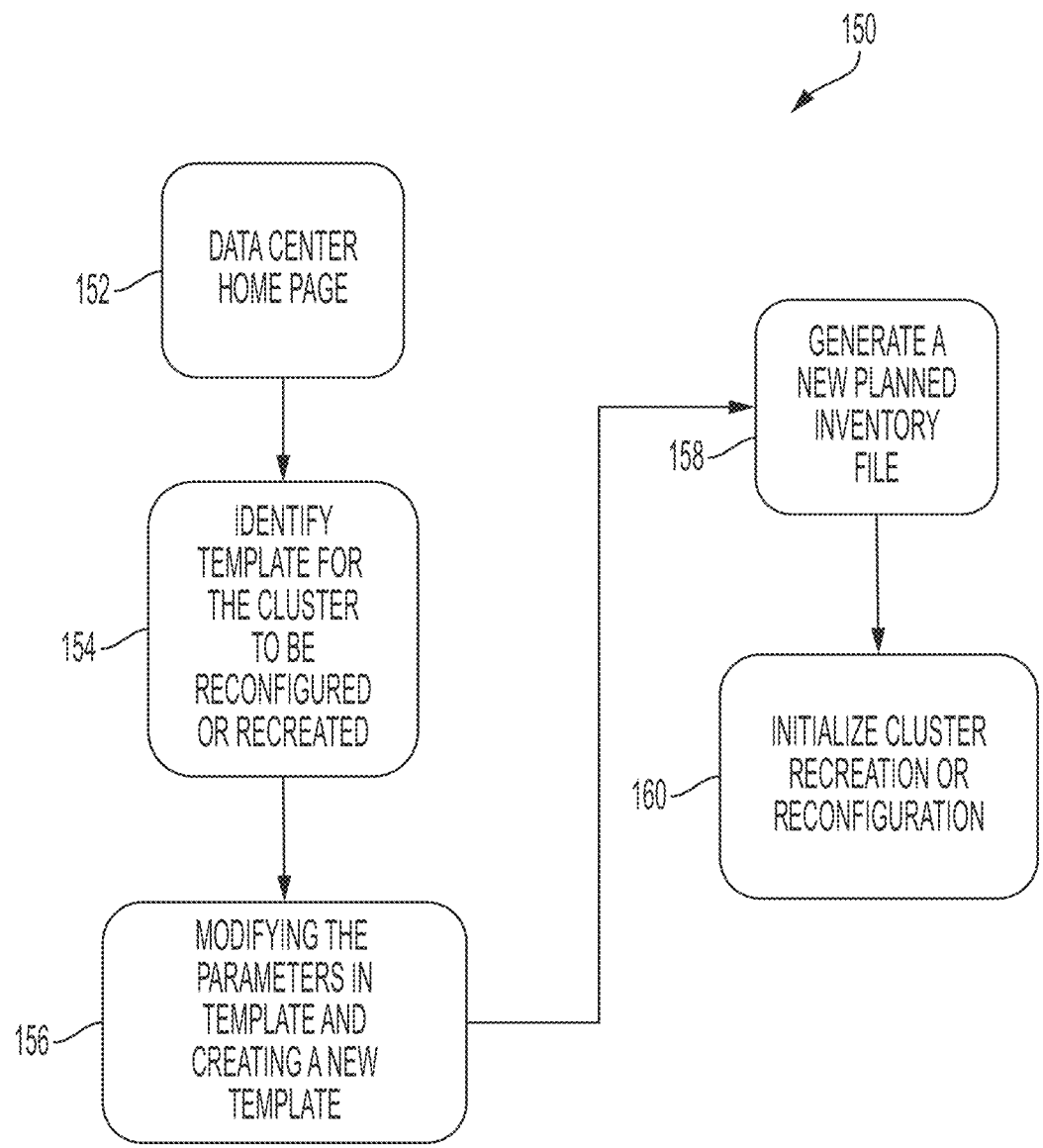
FIG. 1B is a flow diagram representation of a method of reconfiguring a server-cluster, in accordance with some embodiments.

FIG. 1B is a flow diagram representation of a method 150 of reconfiguring a server-cluster, in accordance with some embodiments.

For purposes of the disclosure operations as discussed need not be performed in the order as discussed in this disclosure. Some operations are not listed for the sake of brevity. Unless specifically stated, the operations discussed in FIG. 1B need not be performed in the sequences discussed.

In method 150, at operation 152, user 102 provides a new input request. At user interface 106 user 102 begins a reconfiguration template process. Form here operation 152 moves to operation 154.

In method 150, at operation 154, user interface 106 allows user 102 to select a new template and possibly a template similar to the configuration template being replaced. In a non-limiting example, user 102 may want to select a configuration template similar to the to-be-replaced template to make the inputting of parameters efficient. From here operation 154 moves to operation 156.

In method 150, at operation 156, user 102 inputs any new parameters or parameters that have changed for the purpose of reconfiguration of an already operating cluster. As a non-limiting example, operation 156 receives an input from user 102 at user interface 106 defining a new configuration profile references. In another non-limiting example, user 102 updates parameters of the selected template possibly stored from the last time the same template was reconfigured. From here operation 156 moves to operation 158.

In method 150, at operation 158 data center template engine 114 generates a new inventory file from the crated new master template from operation 156. In a non-limiting example, operation 158 creates a new planned inventory file based on the new master template. For example, the inventory file source code is automatically created for the new inventory file and the new template is ready for use in reconfiguration. From here operation 158 moves to operation 160.

In method 150 at operation 160 SCRS 100 reconfigures the original preconfigured cluster by switching to the new configuration cluster corresponding to the new inventory file. In some embodiments, operation 160 changes the existing configuration of the one or more servers in the preconfigured cluster, based on the new planned inventory file. For example, operation 160 modifies an existing configuration of one or more servers in a preconfigured cluster positioned at an edge location during runtime.

Table 1 below show a non-limiting representation of parameters of configuration profile references in a template, in accordance with some embodiments.

TABLE 1

| Configuration Profile References | | | |
|---|---|---|---|
| Bare Metal profile | Cluster profile | Application profile | Data Center Template |
| Hostname Rule | Install_type | Os_repo_url | Reference to BareMetal profile |
| Ssh user name | Cluster type | Bmaas_artifactory_url | Reference to cluster profile |
| Ssh password | Vrid rule | Kickstart_url | Reference to application profile |
| Bmc user name | Build_url | Rcp_ver | Selection of Master nodes |
| Bmc password | Ha_primary_install_args | Flavor | Selection of Worker nodes |

TABLE 1-continued

Configuration Profile References

| Bare Metal profile | Cluster profile | Application profile | Data Center Template |
| --- | --- | --- | --- |
| Hostdomain | Ha_secondary_install_args | Workload | Selection of workflow to run |
| Search domain | Calico_ip_pool | | |
| Management ip | Dns | | |
| Service ip | Ntp | | |
| VER | Vip | | |
| | Rcp_config_version | | |
| | Version | | |

The example profiles and parameters of table 1 are a possible representation of profiles, parameters and configuration profile references that are modified or changed by user 102. Further, the parameters inputted by user 102 are usable by data center template engine 114 to create a new template.

For example, BareMetal profile shows several possible parameters classified under a BareMetal profile type. Cluster profile shows several possible parameters classified under a cluster profile type. Application profile shows several possible parameters classified as an application profile type. Data center template profile shows several possible workflow or worker node selections.

Based upon the template selected and the parameters inputted by user 102, user interface 106 presents user 102 with a graphical user interface, such as a display screen (FIG. 2A) where user 102 inputs new parameters directed towards the BareMetal profile, cluster profile (FIG. 2B), application profile (FIG. 2C), master nodes (FIG. 2D), worker nodes (FIG. 2D), or workflow (FIG. 2D) to create a new master template.

Figure 2A:
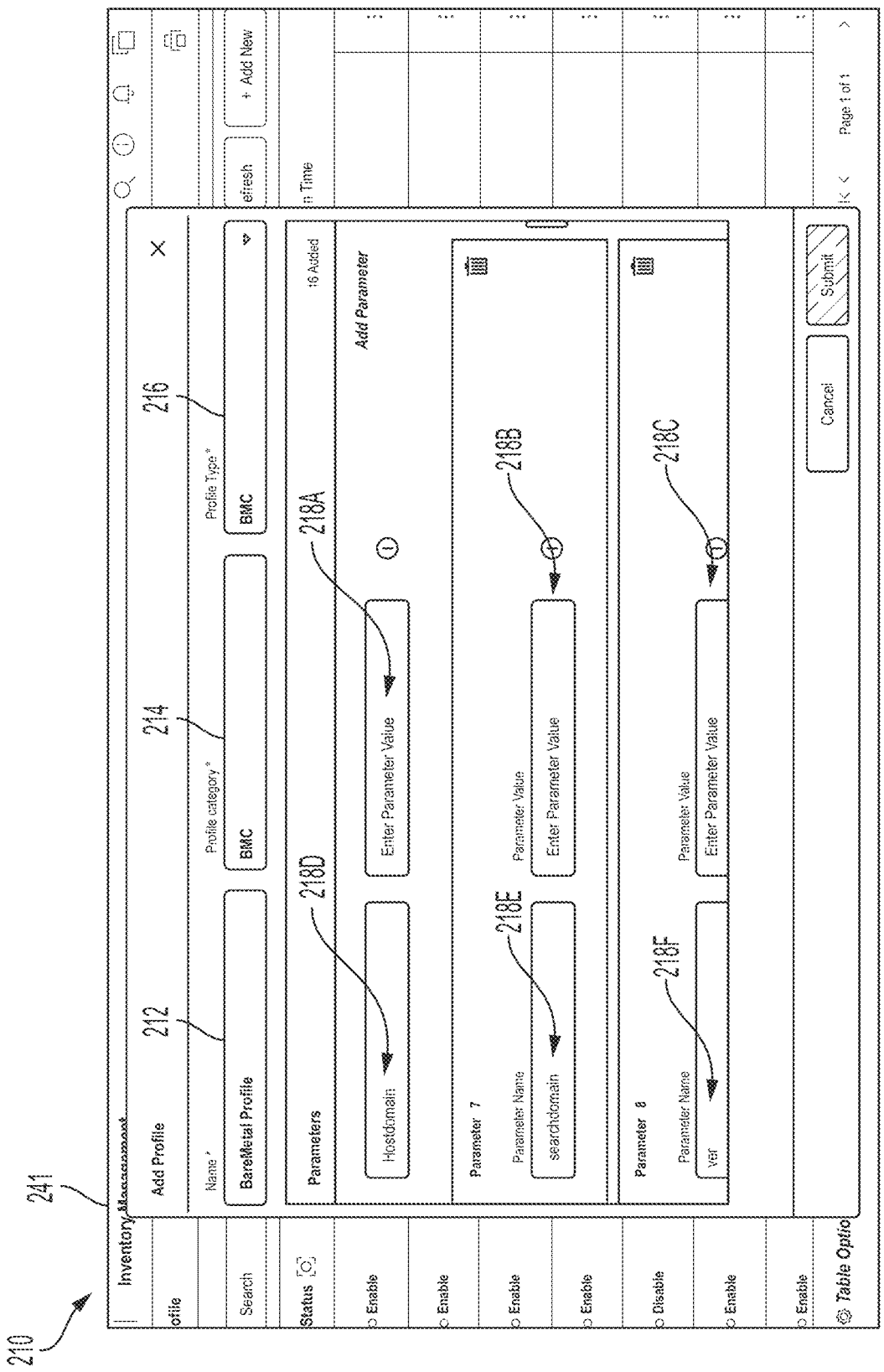
FIG. 2A is a pictorial representation of a BareMetal profile input form, in accordance with embodiments of the present invention.

FIG. 2A is a pictorial representation of a BareMetal profile input form 210, in accordance with embodiments of the present invention.

In some embodiments, BareMetal profile input form 210 is part of an inventory management display 241 that is part of user interface 106. User 102 is able to input a profile name at block 212, a profile category at block 214 and a profile type at block 216. Below blocks 212-216 user 101 is able to input any parameter changes to a BareMetal profile in parameter boxes 218A-C.

For example, at box 218D, input form 210 is requesting a parameter (7) for hostdomain (as shown in BareMetal profile). User 102 is able to input this parameter at box 218A. Further, at box 218E input form 210 is requesting a parameter (8) for searchdomain (as shown in BareMetal profile). User 102 is able to input this parameter at box 218B. Further, at box 218F input for 210 is requesting a parameter (9) for ver (e.g., verification) (as shown in BareMetal profile). User 102 is able to input this parameter at box 218C. In some embodiments, this process is iterative until all parameter values are inputted. In some embodiments, parameters that are modified or changed. For example, user 102 has selected the same template as the last configuration and a few parameters have changed and thus user 102 need make a few changes as the template has retained all the previously inputted parameters. User 102 is able to click on the submit button when completed to save the BareMetal profile or hit cancel to remove any changes to the parameters.

Figure 2B:
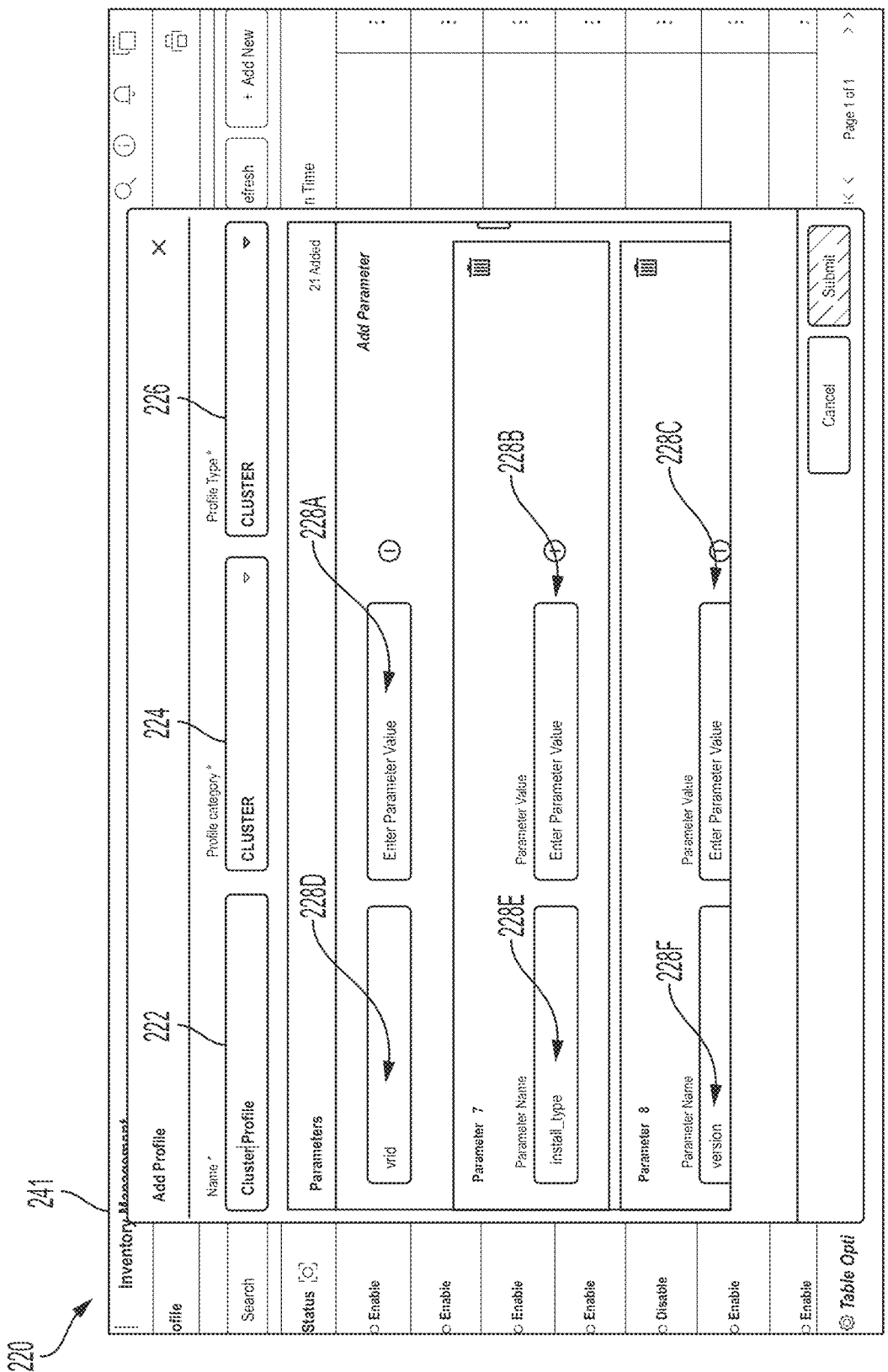
FIG. 2B is a pictorial representation of a cluster profile input form, in accordance with embodiments of the present invention.

FIG. 2B is a pictorial representation of a cluster profile input form 220, in accordance with embodiments of the present invention.

In some embodiments, cluster profile input form 220 is part of an inventory management display 241 that is shown on user interface 106. User 102 is able to input a cluster profile name at block 222, a profile category at block 224 and a profile type at block 226. Below blocks 222-226 user 101 is able to input any cluster parameter changes to a cluster profile in parameter boxes 228A-C.

For example, at box 228D, input form 220 is requesting a parameter (6) for VRID rule (as shown in cluster profile). User 102 is able to input this parameter at box 228A. Further, at box 228E input form 220 is requesting a parameter (7) for install_type (as shown in cluster profile). User 102 is able to input this parameter at box 228B. Further, at box 228F input form 220 is requesting a parameter (8) for version (as shown in cluster profile). User 102 is able to input this parameter at box 228C. In some embodiments, this process is iterative until all parameter values are inputted. In some embodiments, parameters that are modified or changed. For example, user 102 has selected the same template as the last configuration and a few parameters have changed and thus user 102 need make a few changes as the template has retained all the previously inputted parameters. User 102 is able to click on the submit button when completed to save the cluster profile or hit cancel to remove any changes to the parameters.

In some embodiments, server-cluster reconfiguration system 100 allows user 102 to change or modify one or more cluster parameters. In some embodiments, user 102 changes one cluster parameters. In some embodiments, user 102 changes multiple cluster parameters. In some embodiments, user 102 changes all parameters for a server cluster. In some embodiments, a change or modification to the server cluster parameters includes a change to one parameter up to and including changing all the parameters.

Figure 2C:
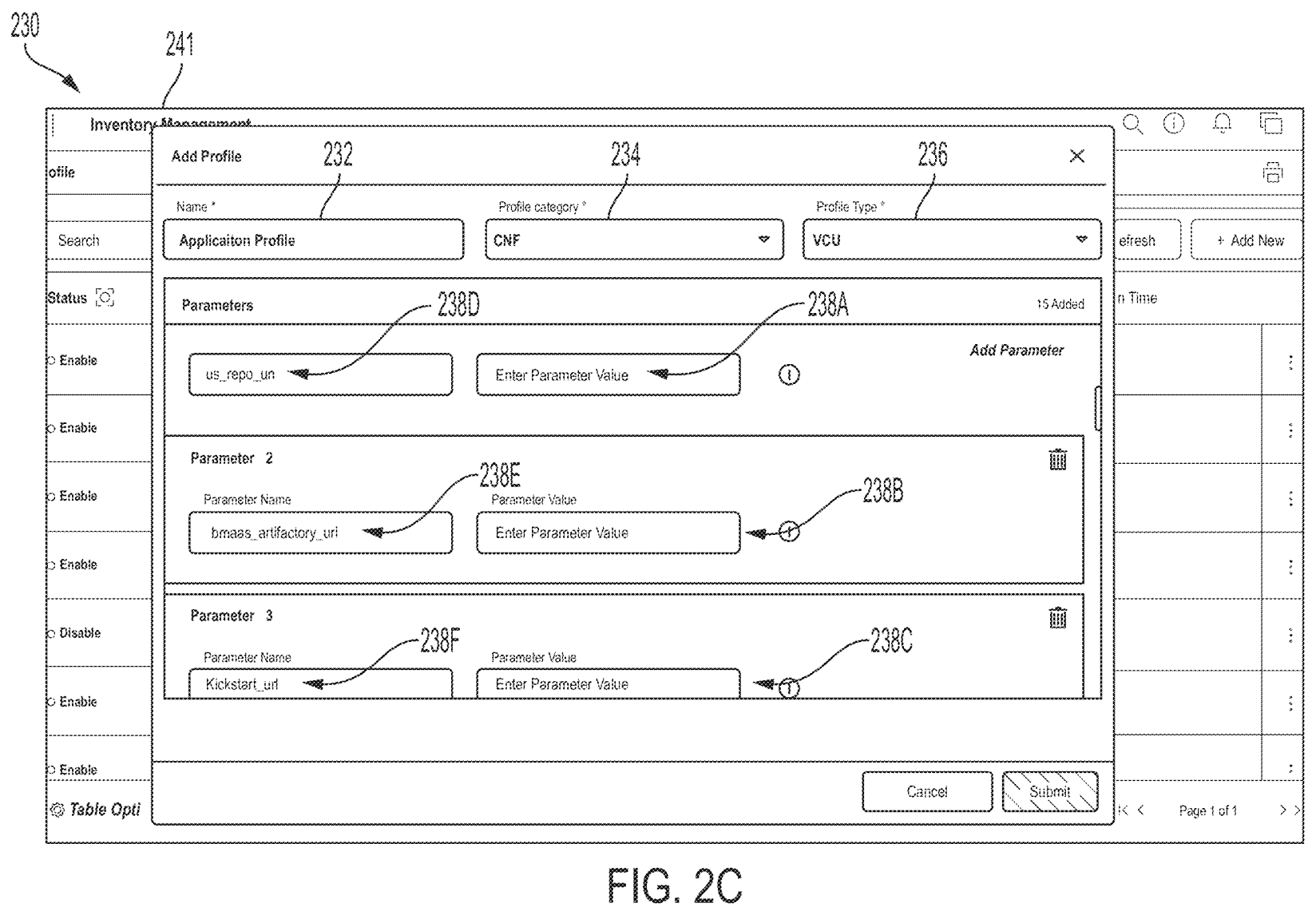

FIG. 2C is a pictorial representation of an application profile input form 230, in accordance with embodiments of the present invention.

In some embodiments, application profile input form 230 is part of an inventory management display 241 that is shown on user interface 106. User 102 is able to input an application name at block 232, an application profile category at block 234 and an application profile type at block 236. Below blocks 232-236 user 102 is able to input any application parameter changes to an application profile in parameter boxes 238A-C.

For example, at box 238D, input form 230 is requesting a parameter (1) for OS_REPO_URL (as shown in application profile). User 102 is able to input this parameter at box 238A. Further, at box 238E input form for 230 is requesting a parameter (2) for BMAAS_ARTIFACTORY_URL (as shown in application profile). User 101 is able to input this parameter at box 238B. Further, at box 228F input form 230 is requesting a parameter (3) for KICKSTART_URL (as shown in application profile). In some embodiments, this process is iterative until all parameter values are inputted. In some embodiments, parameters that are modified or changed. For example, user 102 has selected the same template as the last configuration and a few parameters have changed and thus user 102 need make a few changes as the template has retained all the previously inputted parameters. User 102 is able to input this parameter at box 238C. User 102 is able to click on the submit button when completed to save the cluster profile or hit cancel to remove any changes to the parameters.

In some embodiments, user 102 skips one or more of the requested parameters in each of input forms 210, 220, and 230. In some embodiments, user 102 modifies the parameters that are changing to replace the preconfigured cluster template.

Figure 2D:
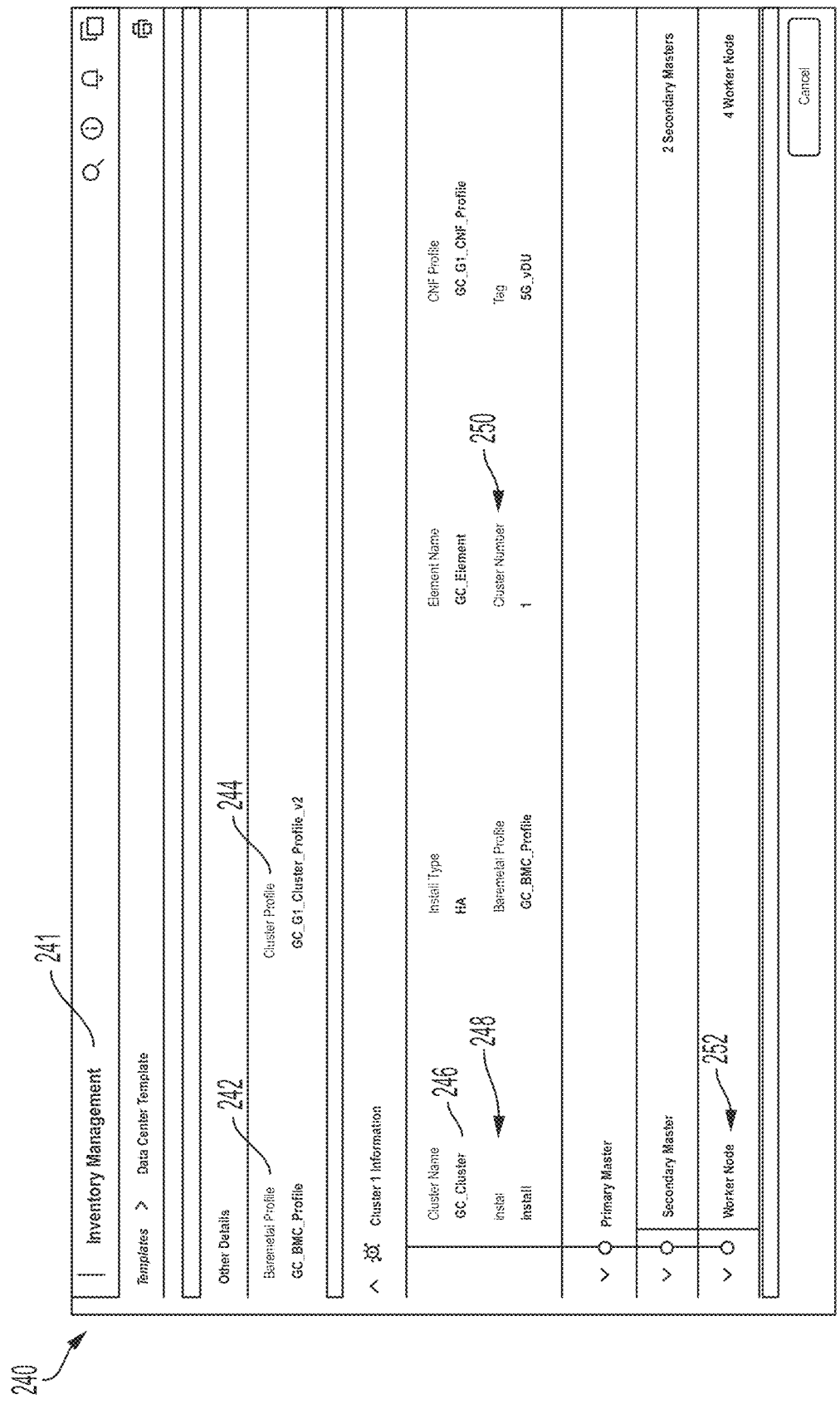
FIG. 2D is a pictorial representation of a data center template display, in accordance with embodiments of the present invention.

FIG. 2D is a pictorial representation of a data center template display 240, in accordance with embodiments of the present invention.

In some embodiments, when user 102 wants to make a change in any parameter, user 102 simply fills a profile template, such as templates 210, 220, and 230, and creates a new master template 240.

In some embodiments, master template 240 is part of an inventory management display 241 that is part of user interface 106. Based upon the inputs of user 102 master template display 240 displays a BareMetal profile 242, a cluster profile 244, cluster name 246, a workflow 248, cluster number 250 and a worker node 252. New cluster "GC_Cluster" shown at cluster name 246 is now ready to be implemented with the inputted parameters submitted by user 102.

Figure 3:
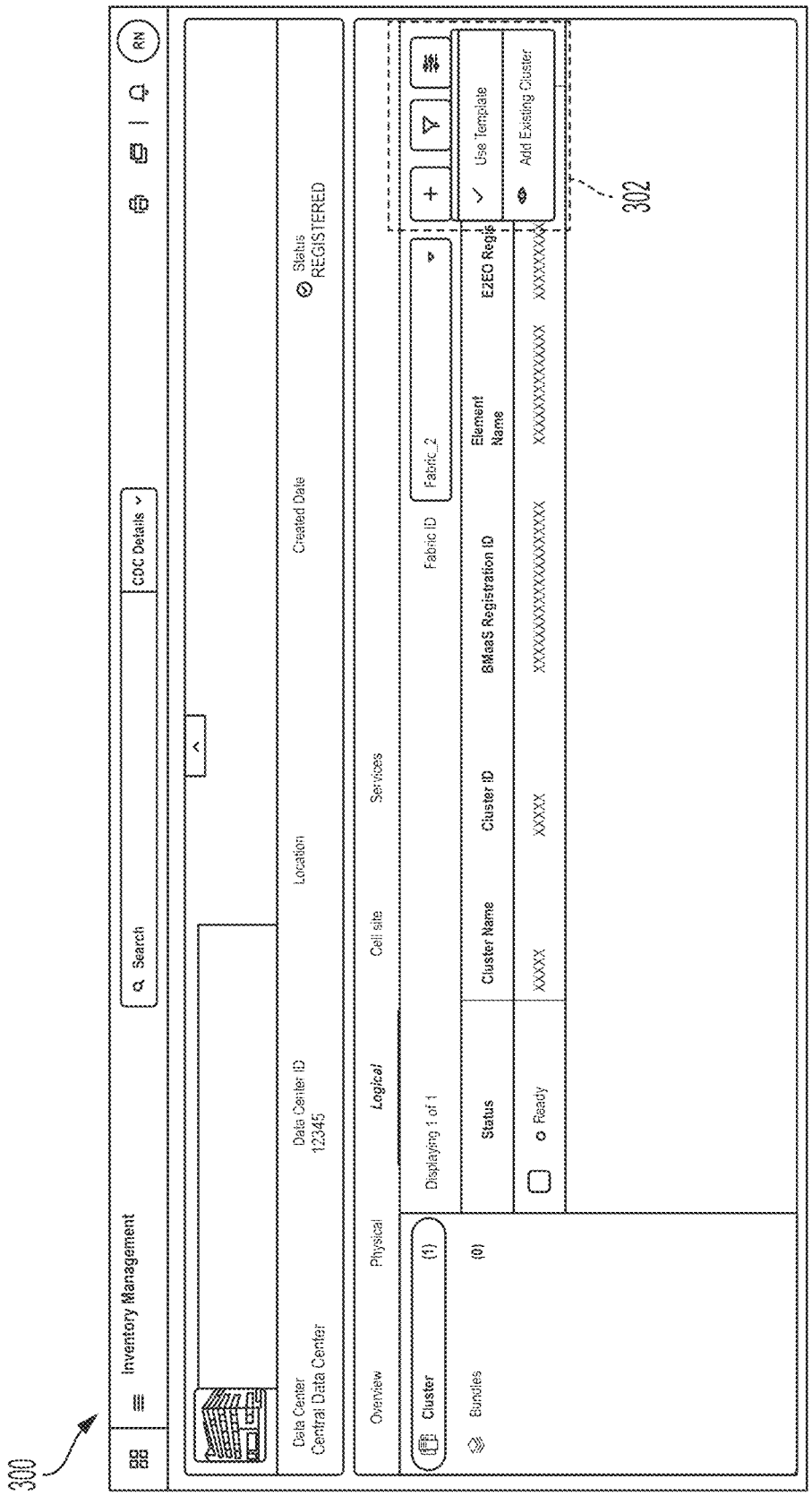
FIG. 3 is a pictorial representation of cluster template selection display, in accordance with some embodiments.

FIG. 3 is a pictorial representation of cluster template selection display 300, in accordance with some embodiments.

User 102 is able to select the newly created template in box 302 of display 300. When user 102 selects to use a new template, a confirmation screen is presented as shown in FIG. 4.

Figure 4:
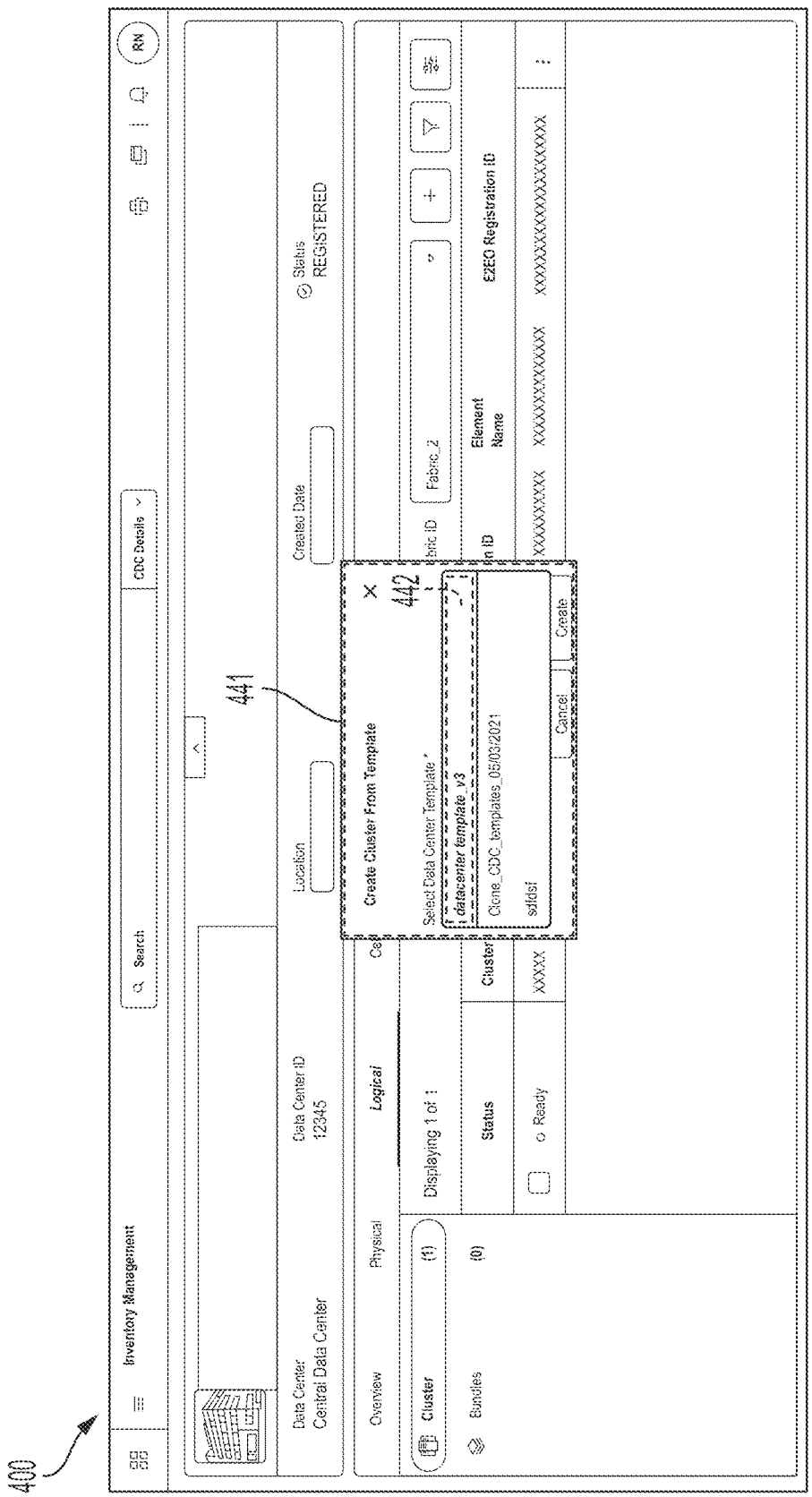
FIG. 4 is a pictorial representation of confirmation display, in accordance with some embodiments.

FIG. 4 is a pictorial representation of confirmation display 400, in accordance with some embodiments.

User 102 is able to create a cluster from template from box 441. Box 441 displays several data center templates user 102 selects from. In some embodiments, selected name 442 coincides with the newly created template name shown in display 300.

Figure 5:
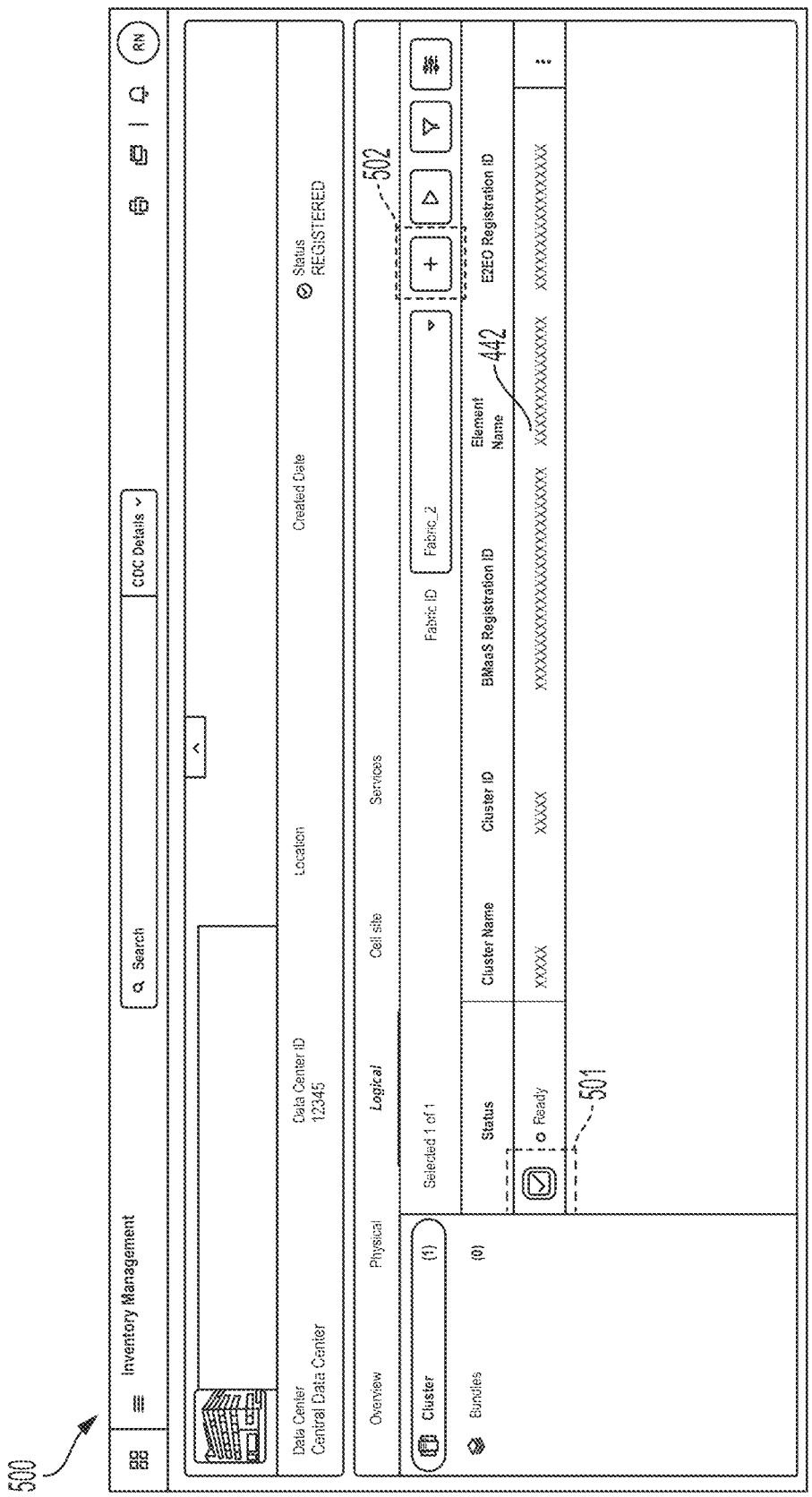
FIG. 5 is a pictorial representation of a generated planned inventory display, in accordance with some embodiments.

FIG. 5 is a pictorial representation of a generated planned inventory display 500, in accordance with some embodiments.

In some embodiments, user 102 selects the newly created template by the selected name 442, and clicking in the check box 501. User 102 then clicks on the "+" or add box 502 to generate the planned inventory file.

Figure 6:
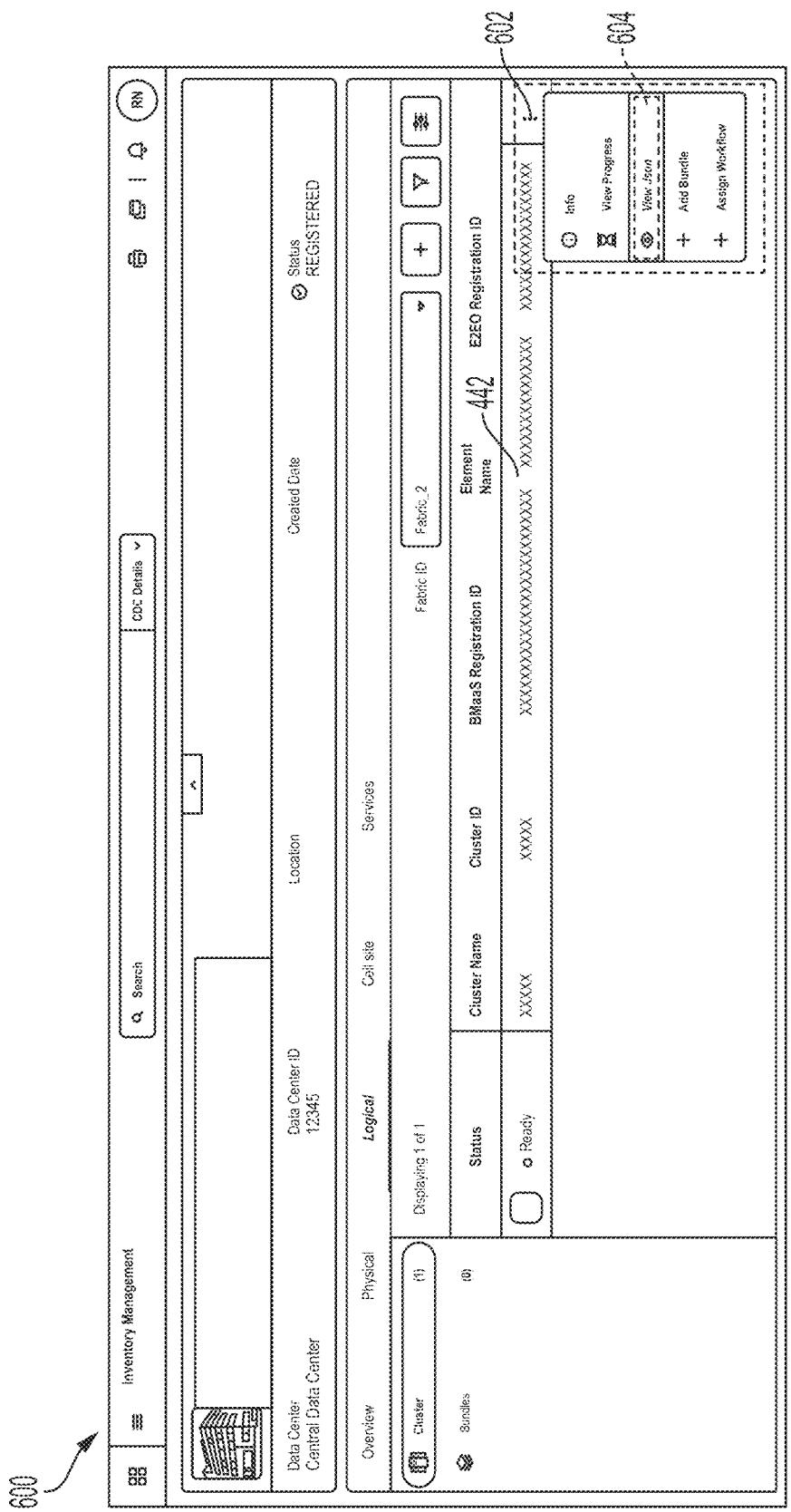
FIG. 6 is a pictorial representation of viewing source code display, in accordance with some embodiments.

FIG. 6 is a pictorial representation of viewing source code display 600, in accordance with some embodiments.

User 102 is able to verify the inventory file code has been generated. User 102 is able to click on three vertical dots 602 and box 604 opens and presents user 102 with an option to view javascript object notation (Json). User 102 then clicks on Json to be taken to a source code display (not shown).

In some embodiments, a source code display screen allows user 102 to review the Json for the inventory source code for implementing the new cluster configuration. Inventory source code is automatically generated based upon the selected template and the parameters inputted by user 102. In some embodiments, this automatic generation of code is performed by artificial intelligence, machine code learning or other suitable applications are within the scope of the disclosure.

Figure 7:
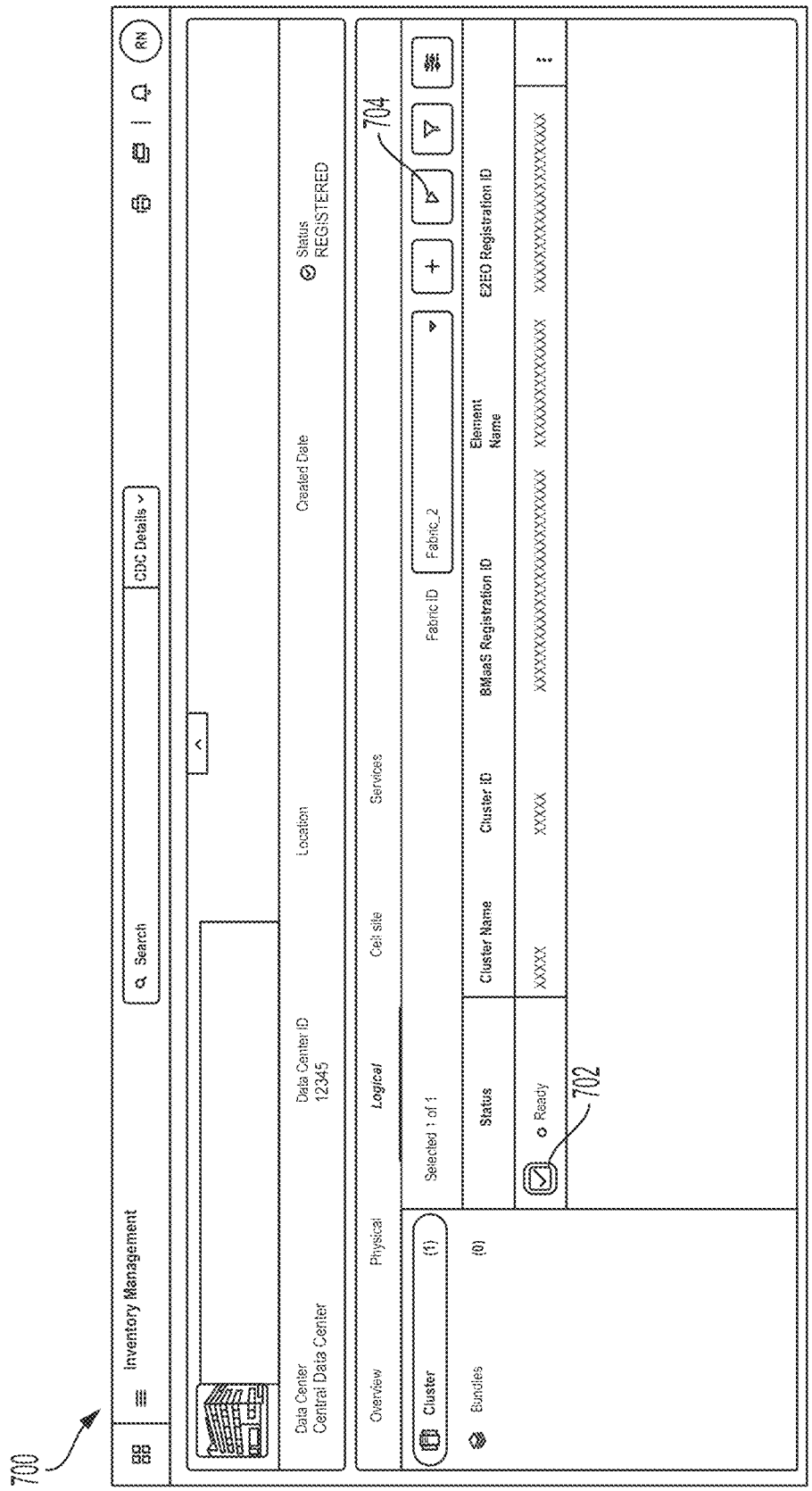
FIG. 7 is a pictorial representation of execute cluster registration display, in accordance with some embodiments.

FIG. 7 is a pictorial representation of execute cluster registration display 700, in accordance with some embodiments.

Execute cluster registration display 700 allows user 102 to select checkbox 702 and click on play button 704 to begin the cluster registration process. In some embodiments, before user 102 registers or unregisters a node in a cluster, user 102 considers are products being activated on a primary master server before user 102 activates the product on any other nodes. In some embodiments, a node cannot be registered with a cluster if the node is already a member of another cluster. In this situation, the node is first unregistered from its current cluster. In some embodiments, node registration occurs directly through the local management interface of the appliance that you want to join the cluster. In some embodiments, the appliance that you are registering is able to communicate with the primary master.

Figure 8:
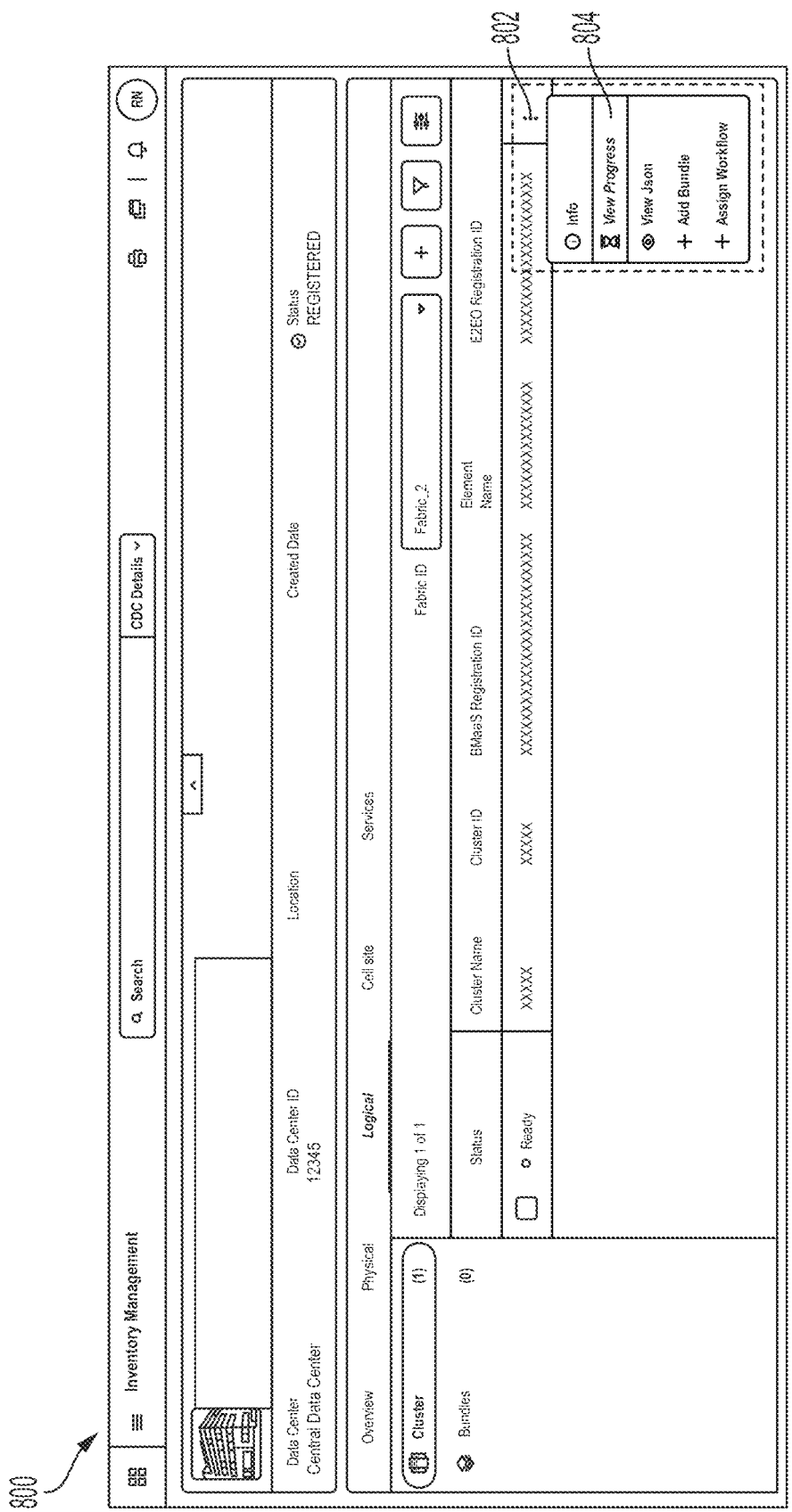
FIG. 8 is a pictorial representation of cluster registration progress display, in accordance with some embodiments.

FIG. 8 is a pictorial representation of cluster registration progress display 900, in accordance with some embodiments.

User 102 is able to track the progress of the cluster registration by clicking on vertical three-line button 802 and clicking on view progress 804.

FIG. 9 is a block diagram of server-cluster reconfiguring processing circuitry 900 in accordance with some embodiments. In some embodiments, server cluster reconfiguring processing circuitry 900 is a general purpose computing device including a hardware processor 902 and a non-transitory, computer-readable storage medium 904. Storage medium 904, amongst other things, is encoded with, i.e., stores, computer program code 906, i.e., a set of executable instructions such as data center template engine 114. Execution of instructions 906 by hardware processor 902 represents (at least in part) a server-cluster reconfiguring tool which implements a portion or all of the methods described herein in accordance with one or more embodiments (hereinafter, the noted processes and/or methods).

Processor 902 is electrically coupled to a computer-readable storage medium 904 via a bus 908. Processor 902 is also be electrically coupled to an I/O interface 910 by bus 908. A network interface 912 is also electrically connected to processor 902 via bus 908. Network interface 912 is connected to a network 914, so that processor 902 and computer-readable storage medium 904 are capable of connecting to external elements via network 914. Processor 902 is configured to execute computer program code 906 encoded in computer-readable storage medium 904 in order to cause server cluster reconfiguring processing circuitry 900 to be usable for performing a portion or all of the noted processes and/or methods, such as method 150, of FIG. 1B. In one or more embodiments, processor 902 is a central processing unit (CPU), a multi-processor, a distributed processing system, an application specific integrated circuit (ASIC), and/or a suitable processing unit.

In one or more embodiments, computer-readable storage medium 904 is an electronic, magnetic, optical, electromagnetic, infrared, and/or a semiconductor system (or apparatus or device). For example, computer-readable storage medium 904 includes a semiconductor or solid-state memory, a magnetic tape, a removable computer diskette, a random access memory (RAM), a read-memory (ROM), a rigid magnetic disk, and/or an optical disk. In one or more embodiments using optical disks, computer-readable storage medium 904 includes a compact disk-read memory (CD-ROM), a compact disk-read/write (CD-R/W), and/or a digital video disc (DVD).

In one or more embodiments, storage medium 904 stores computer program code 906 configured to cause server cluster reconfiguring processing circuitry 900 to be usable for performing a portion or all of the noted processes and/or methods. In one or more embodiments, storage medium 904 also stores information, such as dynamic power transmission algorithm which facilitates performing a portion or all of the noted processes and/or methods.

Server cluster reconfiguring processing circuitry 900 includes I/O interface 910, that is like user interface 106. I/O interface 910 is coupled to external circuitry. In one or more embodiments, I/O interface 910 includes a keyboard, keypad, mouse, trackball, trackpad, touchscreen, cursor direction keys and/or other suitable I/O interfaces are within the contemplated scope of the disclosure for communicating information and commands to processor 902.

Server cluster reconfiguring processing circuitry 900 further includes network interface 912 coupled to processor 902. Network interface 912 allows server cluster reconfiguring processing circuitry 900 to communicate with network 914, to which one or more other computer systems are connected. Network interface 912 includes wireless network interfaces such as BLUETOOTH, WIFI, WIMAX, GPRS, or WCDMA; or wired network interfaces such as ETHERNET, USB, or IEEE-864. In one or more embodiments, a portion or all of noted processes and/or methods, is implemented in two or more server cluster reconfiguring processing circuitry 900.

Server cluster reconfiguring processing circuitry 900 is configured to receive information through I/O interface 910. The information received through I/O interface 910 includes one or more of instructions, data, and/or other parameters for processing by processor 902. The information is transferred to processor 902 via bus 908. Server cluster reconfiguring processing circuitry 900 is configured to receive information related to a UI through I/O interface 910. The information is stored in computer-readable medium 904 as user interface (UI) 918.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application.

In some embodiments, the processes are realized as functions of a program stored in a non-transitory computer readable recording medium. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

A system of one or more computers are configured to perform particular operations or actions by virtue of having software, firmware, hardware, or a combination of them installed on the system that in operation causes or cause the system to perform the actions. One or more computer programs are configured to perform particular operations or actions by virtue of including instructions that, when executed by data processing apparatus, cause the apparatus to perform the actions. One general aspect includes identifying a master template from a repository corresponding to one or more servers in a preconfigured cluster positioned at an edge location. The identifying also includes receiving an input from a user defining a new configuration by the user. The identifying also includes changing one or more parameter values in at least one configuration profile references. The identifying also includes creating a new master template based on the one or more parameter values. The identifying also includes creating a new planned inventory file based on the new master template. The identifying also includes changing an existing configuration of the one or more servers in the preconfigured cluster during runtime, based on the new planned inventory file. Other embodiments of this aspect include corresponding computer systems, apparatus, and computer programs recorded on one or more computer storage devices, each configured to perform the actions of the methods. Implementations may include one or more of the following features. The method where the identifying the master template corresponding to the preconfigured cluster from the repository includes accessing one or more inventory templates. The identifying the master template corresponding to the preconfigured cluster from the repository includes determining one or more of the at least one configuration profile references. The identifying the master template corresponding to the preconfigured cluster from the repository includes determining at least one of a cluster profile. The identifying the master template corresponding to the preconfigured cluster from the repository includes determining at least one cloud-native function (CNF) profile. The method includes switching the one or more servers in the preconfigured cluster from the existing configuration to the new master template during run time. The identifying the master template corresponding to the preconfigured cluster from the repository includes determining a BareMetal profile. Implementations of the described techniques may include hardware, a method or process, or computer software on a computer-accessible medium.

In some embodiments, a system includes processing circuitry. The system also includes a memory connected to the processing circuitry, where the memory is configured to store executable instructions. The executable instructions when executed by the processing circuitry, facilitate performance of operations, including receiving, from a user, new input request including new parameters for an existing cluster. Identifying, from a database, templates that correspond to the existing cluster. Modifying the identified template, based on user inputted parameters. Creating a master template. Reconfiguring the existing cluster. Other embodiments of this aspect include corresponding computer systems, apparatus, and computer programs recorded on one or more computer storage devices, each configured to perform the actions of the methods.

Implementations may include one or more of the following features. The system where the performance of operations further includes switching to the created master template. The system includes creating the master template based upon the user inputted parameters. The system includes creating a new inventory file. The system includes reconfiguring the existing cluster based upon the new inventory file. The system includes creating the master template based upon the user inputted parameters. The system includes storing the master template in a data center template database.

In some embodiments, a method for reconfiguring sever clusters includes obtaining, based upon user input, a pre-stored cluster template. The method also includes modifying one or more parameters included in the pre-stored cluster template. The method also includes creating a new cluster template automatically based on the user inputs and modified. The method also includes creating a new planned inventory filed based on the new cluster template. The method also includes switching from existing configuration parameters to the one or more parameters during execution. Other embodiments of this aspect include corresponding computer systems, apparatus, and computer programs recorded on one or more computer storage devices, each configured to perform the actions of the methods.

Implementations may include one or more of the following features. The method includes reconfiguring the existing configuration parameters within a pre-configured server located at an edge location. The method includes storing of the new cluster template. The method includes obtaining, based upon user input, the new cluster template. The method includes modifying existing cluster templates. Implementations of the described techniques may include hardware, a method or process, or computer software on a computer-accessible medium.

The foregoing outlines features of several embodiments so that those skilled in the art better understand the aspects of the present disclosure. Those skilled in the art should appreciate that they readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they make various changes, substitutions, and alterations herein without departing from the spirit and scope of the present disclosure.

What is claimed is:

1. A method, comprising:
    identifying a master template from a repository corresponding to one or more servers in a preconfigured cluster positioned at an edge location, wherein the identifying the master template corresponding to the preconfigured cluster from the repository comprises:
        accessing one or more inventory templates;
        determining one or more configuration profile references; and
        determining at least one cloud-native function (CNF) profile;
    receiving an input from a user defining a new configuration set by the user;
    changing one or more parameter values in the one or more configuration profile references, the one or more configuration profile references corresponds to the identified master template;
    creating a new master template based on the one or more parameter values;
    creating a new planned inventory file based on the new master template;
    changing an existing configuration of the one or more servers in the preconfigured cluster during runtime, based on the new planned inventory file; and
    switching the one or more servers in the preconfigured cluster based upon the new planned inventory file.

2. The method of claim 1, wherein the identifying the master template corresponding to the preconfigured cluster from the repository comprises: determining at least one of a cluster profile.

3. The method of claim 1, wherein the identifying the master template corresponding to the preconfigured cluster from the repository comprises: determining a BareMetal profile.

4. A system, comprising:
    processing circuitry; and
    a memory connected to the processing circuitry, wherein the memory is configured to store executable instructions that, when executed by the processing circuitry, facilitate performance of operations, to:
        receive, from a user, input request including one or more parameters for an existing cluster;
        identify, from a database, one or more templates that correspond to the existing cluster, wherein the identifying the one or more templates corresponding to the existing cluster comprises:
            access one or more inventory templates;
            determine one or more configuration profile references; and
            determine at least one cloud-native function (CNF) profile;
        modify the one or more identified templates, based on the user inputted one or more parameters;
        create a master template;
        reconfigure the existing cluster, wherein the reconfiguring the existing cluster comprises:
            switch one or more servers in the existing cluster based upon the user inputted one or more parameters.

5. The system of claim 4, wherein the performance of operations further comprises:
    switch to the created master template.

6. The system of claim 4, wherein the creating the master template is based upon the user inputted one or more parameters.

7. The system of claim 6, wherein the performance of operations further comprises:
    store the master template in a data center template database.

8. The system of claim 5, wherein the performance of operations further comprises:
    create a new inventory file.

9. The system of claim 8, wherein the performance of operations further comprises:
    reconfigure the existing cluster with the new inventory file based upon the user inputted one or more parameters.

10. A method for reconfiguring sever clusters, comprising:
    identifying a pre-stored cluster template from a repository corresponding to one or more servers in a preconfigured cluster positioned at an edge location, wherein the identifying the pre-stored cluster template corresponding to the preconfigured cluster from the repository comprises:
        accessing one or more inventory templates;
        determining one or more configuration profile references; and
        determining at least one cloud-native function (CNF) profile;
    obtaining, based upon user input, the pre-stored cluster template;
    modifying one or more parameters included in the pre-stored cluster template;
    creating a new cluster template automatically based on the user inputs and modified;
    creating a new planned inventory file based on the new cluster template; and
    switching at least a portion of existing configuration parameters to the one or more parameters during execution; and
    switching the one or more servers in the preconfigured cluster based upon the new planned inventory file.

11. The method of claim 10, further comprising:
    reconfiguring one or more of the existing configuration parameters within a pre-configured server located at the edge location.

12. The method of claim 10, further comprising:
    storing of the new cluster template.

13. The method of claim 12, further comprising:
obtaining, based upon the user input, the new cluster template.

14. The method of claim 10, wherein the new cluster template is created automatically.

15. The method of claim 10, wherein the identifying the pre-stored cluster template corresponding to the preconfigured cluster from the repository comprises:
determining one or more cluster profiles.

16. The method of claim 10, wherein the identifying the pre-stored cluster template corresponding to the preconfigured cluster from the repository comprises:
determining a BareMetal profile.

17. The method of claim 10, further comprising:
switching to the new cluster template.

18. The method of claim 10, wherein the creating the new cluster template is based upon the one or more parameters.

19. The method of claim 12, wherein storing the new cluster template comprises:
Storing the new cluster template in a data center template database.

20. The method of claim 10, wherein the switching the one or more servers in the preconfigured cluster based upon the new planned inventory file comprises:
reconfiguring the preconfigured cluster with the new planned inventory file based upon the one or more parameters.

* * * * *